United States Patent
Somanath et al.

(10) Patent No.: US 11,676,009 B2
(45) Date of Patent: Jun. 13, 2023

(54) MACHINE LEARNING BASED ROTOR ALLOY DESIGN SYSTEM

(71) Applicant: United Technologies Corporation, Farmington, CT (US)

(72) Inventors: Nagendra Somanath, South Windsor, CT (US); Ryan B. Noraas, Hartford, CT (US); Michael J Giering, Bolton, CT (US); Olusegun T Oshin, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 776 days.

(21) Appl. No.: 16/593,328

(22) Filed: Oct. 4, 2019

(65) Prior Publication Data
US 2021/0103805 A1     Apr. 8, 2021

(51) Int. Cl.
| | |
|---|---|
| *G06N 3/08* | (2023.01) |
| *B64F 5/00* | (2017.01) |
| *G06V 10/764* | (2022.01) |
| *G06V 10/82* | (2022.01) |

(52) U.S. Cl.
CPC .................. *G06N 3/08* (2013.01); *B64F 5/00* (2013.01); *G06V 10/764* (2022.01); *G06V 10/82* (2022.01)

(58) Field of Classification Search
None
See application file for complete search history.

(56) References Cited

U.S. PATENT DOCUMENTS

| | | | | |
|---|---|---|---|---|
| 6,165,290 A | * | 12/2000 | Rabinkin | ........... B23K 35/3046 148/403 |
| 2004/0260662 A1 | * | 12/2004 | Staelin | .................... G06N 3/08 706/15 |

(Continued)

FOREIGN PATENT DOCUMENTS

| | | | |
|---|---|---|---|
| CN | 103352192 | | 10/2013 |
| CN | 105523195 | * | 4/2016 |

(Continued)

OTHER PUBLICATIONS

Liu et al., "A predictive machine learning approach for microstructure optimization and materials design," Jun. 2015, Scientific Reports, pp. 1-12 (Year: 2015).*

*Primary Examiner* — Andrew G Yang
(74) *Attorney, Agent, or Firm* — Carlson, Gaskey & Olds, P.C.

(57) ABSTRACT

A method for designing a material for an aircraft component according to one example includes training a neural network to correlate microstructural features of an alloy with material properties of the alloy by at least providing a set of images of the alloy. Each of the images in the set of images has varied constituent compositions and at least one patch of corresponding data is embedded into the image. The method also includes determining non-linear relationships between the microstructural features and corresponding empirically determined material properties via a machine learning algorithm, receiving a set of desired material properties of the alloy for aircraft component, and determining a set of microstructural features capable of achieving the desired material properties of the alloy based on the determined non-linear relationships.

17 Claims, 4 Drawing Sheets

(56) References Cited

U.S. PATENT DOCUMENTS

| | | | |
|---|---|---|---|
| 2009/0310864 A1* | 12/2009 | Takagi | G06T 7/42 |
| | | | 382/190 |
| 2014/0236548 A1 | 8/2014 | Conduit et al. | |
| 2016/0024621 A1* | 1/2016 | Cheney | B05D 1/36 |
| | | | 420/101 |
| 2017/0102689 A1 | 4/2017 | Khajepour et al. | |
| 2018/0285678 A1* | 10/2018 | Baum | G06F 30/30 |
| 2019/0125192 A1* | 5/2019 | Kusu | G16H 20/40 |
| 2019/0185975 A1* | 6/2019 | Dolman | C22C 38/18 |
| 2019/0211431 A1* | 7/2019 | Zhan | C22C 21/04 |
| 2020/0175675 A1* | 6/2020 | Ogino | G06T 5/001 |
| 2020/0331102 A1* | 10/2020 | Shibahara | G06F 30/23 |
| 2021/0063376 A1* | 3/2021 | Li | G01N 33/204 |

FOREIGN PATENT DOCUMENTS

| | | | | |
|---|---|---|---|---|
| CN | 106055844 | | 10/2016 | |
| CN | 110411850 | * | 11/2019 | G01N 3/18 |
| CN | 110619355 | * | 12/2019 | G06K 9/62 |
| FR | 2894452 A1 | * | 6/2007 | A61B 5/0068 |
| KR | 20200080391 | * | 7/2020 | |

* cited by examiner

MACHINE LEARNING BASED ROTOR ALLOY DESIGN SYSTEM

TECHNICAL FIELD

The present disclosure is directed to a process for selecting and optimizing alloys for a gas turbine engine rotor.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Within the gas turbine engine are multiple distinct components, each of which is subjected to various different loads and thermal stresses. When designing and manufacturing the components, it is important to select the proper material, including the proper underlying microstructures, in order to ensure that the component can withstand the stresses and loads placed upon the component.

SUMMARY OF THE INVENTION

A method for designing a material for an aircraft component according to one example includes training a neural network to correlate microstructural features of an alloy with material properties of the alloy by at least providing a set of images of the alloy, each of the images in the set of images having varied constituent compositions and at least one patch of corresponding data embedded into the image, and determining non-linear relationships between the microstructural features and corresponding empirically determined material properties via a machine learning algorithm, receiving a set of desired material properties of the alloy for aircraft component, and determining a set of microstructural features capable of achieving the desired material properties of the alloy based on the determined non-linear relationships.

Another example of the above described method further includes manufacturing an alloy having the determined set of microstructural features.

Another example of any of the above described methods further includes comprising manufacturing the aircraft component using the alloy having the determined set of microstructural features.

In another example of any of the above described methods each image in the set of images is an upscaled RGB (Red-Green-Blue) image.

In another example of any of the above described methods each image in the set of images includes a training data region, and wherein the training data region includes a centroid of the image.

In another example of any of the above described methods the training data region is a portion of the image including 80% of the image closest to the centroid.

In another example of any of the above described methods the at least one patch is contained outside of the training data region.

In another example of any of the above described methods the at least one patch is contained within a blank region of the image.

In another example of any of the above described methods the empirically determined material properties include Young's modulus (E), Poisson's ratio, yield strength (Y) and a thermal-elastic strain (ms).

In another example of any of the above described methods the set of determined material properties corresponding to each image includes empirically determined data corresponding to each image.

In another example of any of the above described methods each image includes at least one non-quantifiable material state.

According to one example, a system for automatically determining microstructural features includes a computer system having an image set input, each image in the image set input included embedded non-visual data, and a memory and a processor, the memory storing instructions for operating a neural network, wherein the neural network is trained to correlate features of an alloy with material properties of the alloy by at least receiving a set of images of the alloy at the image set input, each of the images in the set of images having varied constituent compositions, and receiving a set of empirically determined material properties corresponding to each image at the non-visual data input, embedding the non-visual data of each image onto the corresponding image, and determining non-linear relationships between the microstructural features and corresponding empirically determined material properties via a machine learning algorithm, the computer system further including a third input configured to receive one of a set of desired material properties of the alloy for aircraft components and a desired image of the alloy for aircraft components, wherein the memory includes instructions for causing the neural network to determine a set of process parameters capable of achieving the desired material properties of the alloy based on the determined non-linear relationships, and an output configured to output the determined set of microstructural features.

Another example of the above described system for automatically determining microstructural features includes the neural network is configured to receive supplementary training by receiving at least one image of an underlying material of a manufactured component including at least one non-image data patch disposed in a blank region of the image.

Another example of any of the above described systems automatically determining microstructural features includes each image in the set of images is a RGB (Red-Green-Blue) image.

Another example of any of the above described systems automatically determining microstructural features includes each image includes at least one non-quantifiable state.

Another example of any of the above described systems automatically determining microstructural features includes the empirically determined material properties include Young's modulus (E), Poisson's ratio, yield strength (Y) and a thermos-elastic strain (ms).

DETAILED DESCRIPTION OF AN EMBODIMENT

When selecting a material for a gas turbine engine component, or any other component that may be subjected to extreme stresses and loads, it is important to ensure that the material composition including any underlying material constituents achieves the necessary material properties for the component to withstand the environment that the component is operating in.

Some materials, such as Aluminum (Al)-Titanium (Ti) based alloys, and other alpha-beta variants, have a combination of high strength-to-density ratio, high hardness, and good resistance to stress corrosions and are generally desirable for high-pressure aerospace applications. Certain features of an alloy, such as workability and localized residual strain retention, can reduce the life of the component constructed of the material. In alternative examples, the methods and processes described herein could be applied to all alloys in general and are not limited to Al-Ti based alloys or to alpha-beta alloys.

To improve the workability and plasticity of the alloys, the design and deformation process is optimized with consideration for the alloy composition and grain refinement information. The flow stress and microstructure evolution of a material during plastic deformation can be determined using a constitutive equation containing stress, strain, strain rate, and deformation temperature. This equation can, in turn, be utilized to determine if a given material composition is suitable for a given component application without requiring prototyping and testing of actual components or material samples.

In one example system, a device for aiding in this design includes a rotor alloy design for life enhancement system that aids in designing alloy microstructures with improved fatigue, creep, tensile properties for enhancing the life of rotors incorporated in a gas turbine engine. The same system may also be used for other flowpath components beyond rotors, such as vanes and blade outer air seals. The driving mechanism developed for the embedded device ensures tailorability of the alloy microstructure composition/morphology to create new high temperature, durable super alloys that have a positioned grain structure, grain boundaries and improved temperature capability using property vector augmentation to microstructure image data.

Figure 1:
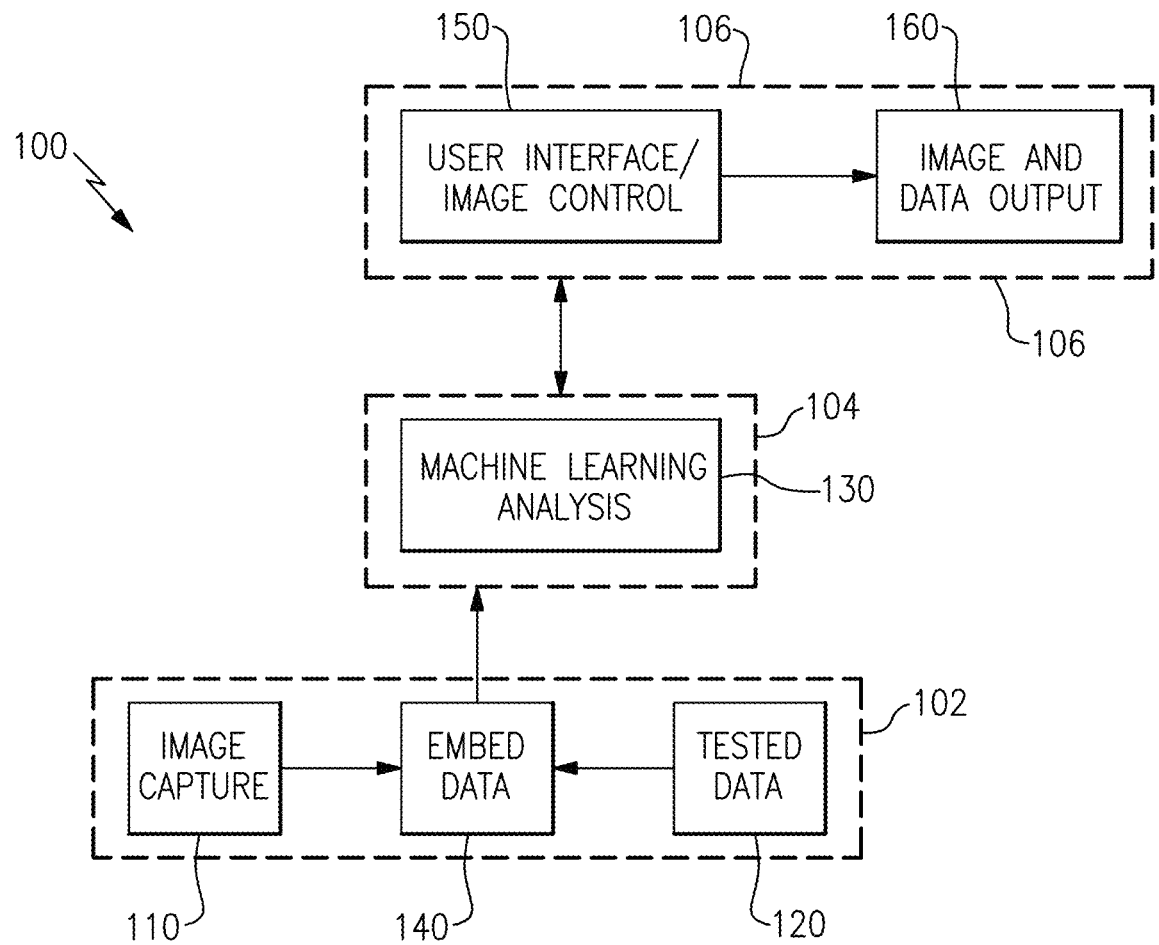
FIG. 1 illustrates an exemplary process for training an advanced neural network.

FIG. 1 schematically illustrates a high level representation of the embedded device 100 described above with a training stat layer 102, an embedded compute layer 104, and an application layer 106. In some examples, all layers 102, 104, 106 of the device 100 can be incorporated into a single computing device. In other examples, the training data layer 102 may be applied before embedding and the computing device 100 can include only the compute layer 104 and the application layer 106. As a top level overview, the device 100 uses machine learning in conjunction with an embedded augmented data feature to analyze images with embedded data (referred to alternately as a data-picture tensor) to determine expected properties of the pictured alloy by using processing controls and alloy composition.

The device 100 uses a combination of images from an image capturing system 110, and observed data and/or empirically tested data of the imaged samples from a tested data database to train a machine learning system 130. In practice, each image from the image capture system 110 is paired with the corresponding data from the tested data set and the corresponding data is embedded into the captured image using an embed data module 140 within the device. The data can be embedded into the image using any embedding system including correlated databases, meta data, and the like, provided the system for embedding the data does not alter the image itself.

By using the combination of tested and observed data and actual images of the alloy to train the machine learning system 130, the machine learning system 130 can develop an algorithm that accounts for material states of the alloy that are present in the image, but are not quantifiable. By way of example, the image of a given alloy composition may reveal states such as grain size, grain boundaries, agglomeration of constituents, constituents. high cycle fatigue, tensile strength, temperature based strength, but these states cannot be quantified numerically in the test data. These states are referred to as non-quantifiable states.

In the example device of FIG. 1, the machine learning system is a graphic lowering (GLOW) based machine learning analysis 130 included in the embedded compute layer 104. The embedded compute layer 104 is a computational layer that trains and tunes the machine learning analysis 130 based on the embedded image data from the training data layer 102. In one example, the data is fused with the image by concatenating the image and the data along a channel axis. As an example, a given RGB image of dimensions [Width (W)×Height (H)×3] with a corresponding segmentation mask (set of data corresponding to the image) of dimensions [W×H×1] results in a data tensor with dimensions [W×H×X 4]. The GLOW machine learning process is modified to operate using [W×H×X 4] data instead of [W×H×X 3] data. This change can be achieved in one example by modifying the final convolutional layer of the data generator, such that the number of output channels of the machine learning system 130 is equal to the number of channels of the required data tensor.

In order to verify the accuracy of the trained machine learning system, a similar principle is applied to the discriminator portion of the machine learning system. The modification allows the discriminator to accept data tensors as input, and the discriminator determines if the input data tensor is real or synthetic.

In the application layer 106, a user can utilize a user interface 150 to input desired physical properties, as well as image data illustrating the desired non-quantifiable states. Based on the input image data and user data, the machine learning analysis 130 can provide an output 160 alloy composition. In an alternate mode of usage, rather than inputting desired properties, the user can input an image of an actual manufactured alloy, and the machine learning system 130 can review the input image and determine an underlying composition of the alloy and expected properties and non-quantifiable states of the alloy.

In some examples, processing parameters, such as temperature processing regimes, cooling rates, rate of melt flow, temperature, pressure, viscosity, etc. are included as part of the embedded data during the training process, and the device 100 can be used to determine processing parametric control (i.e. control of processing parameters during manufacturing) to achieve a desired microstructure state of the end alloy.

In one example, for relatively low-ductility materials such as Ti2Al* alloys, wrought processing is particularly useful to achieve the full potential of materials due to the need to optimize mechanical properties through microstructure manipulation. Properties of Ti base intermetallics are more composition-sensitive than conventional Ti alloys. Ti2Al* alloys require additional precautions during processing because their alloying elements have large differences in melting points and densities (Ti: 1668° C., 4.5 g/cm3; Al: 660° C., 2.7 g/cm3). Ti2Al* ingot material usually suffers from pronounced segregation of alloying elements, shrinkage porosity, coarse microstructures, and texture. For the casting process, minimizing segregation is important. Ingot inhomogeneities in both composition and microstructure are difficult to remove by subsequent wrought processing.

In another example, the machine learning system 130 can be used to determine powder metallurgy parameters. Powder metallurgy (PM) is a longstanding method of producing Ni-base alloy components used in turbine engines. The advantage of the PM technique is that high quality, near-net-shape, and homogeneous parts can be made with substantially reduced machining and scrap. For high-alloyed materials such as Ti2Al* PM methods are far superior to cast-and wrought processing ins some applications for various reasons. Ti2Al* powders are generally too strong to be cold compacted. They are therefore usually processed by hot isostatic pressing (HIP) followed by heat treatment. Dimensions of the final components are calculated based on finite element modeling of powder shrinkage during HIP. Small volume fractions of residual pores (less than several microns in diameter) do not seem to affect tensile properties because Ti2Al* alloys have adequate ductility to withstand small internal stress risers, but these same pores can act as fatigue crack initiation sites during cyclic loading.

Figure 2:
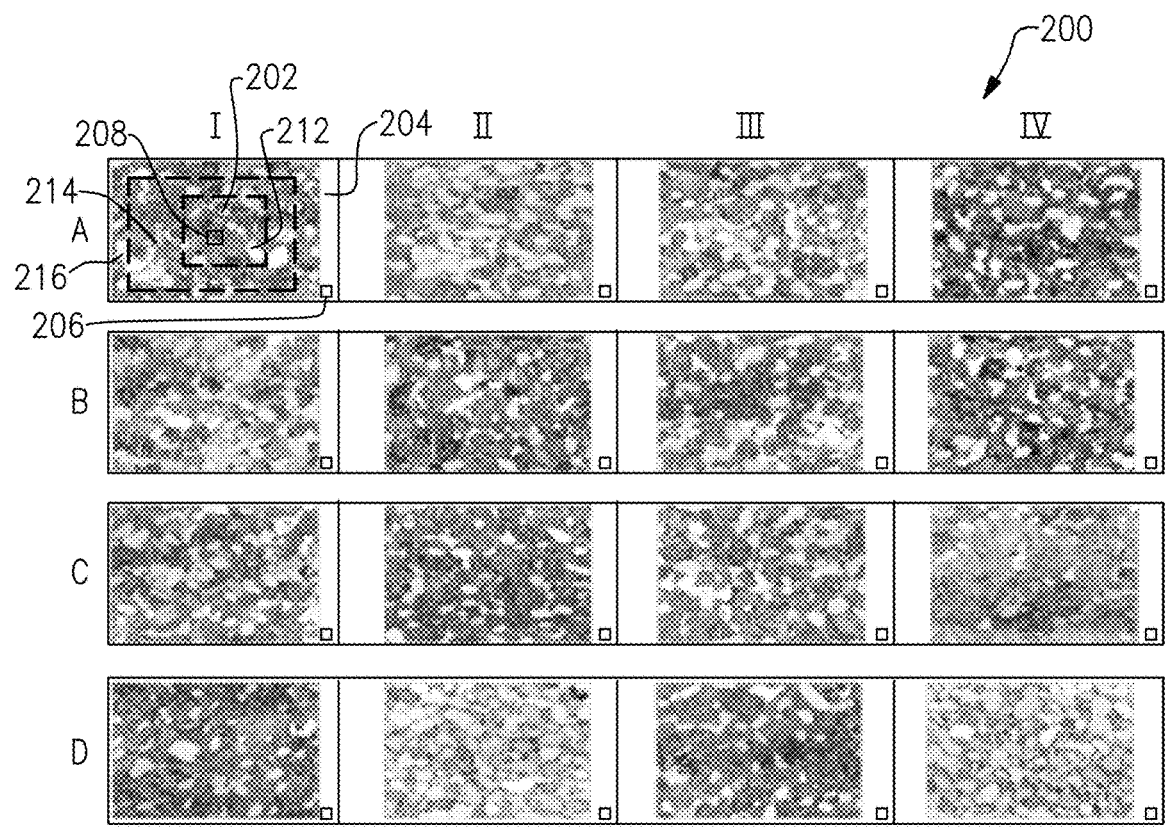
FIG. 2 schematically illustrates an exemplary image data set.

With continued reference to FIG. 1, FIG. 2 illustrates an exemplary input image set 200 including sixteen images (illustrated in grid form on positions AI-DIV) of various microstructures of a Ti-6Al-4V alloy. In a practical embodiment, substantially more than sixteen images can be used to train the machine learning analysis 130 of FIG. 1. While the Ti-6Al-4V alloy is used in the exemplary embodiment, the same training process and neural network principles apply to, and can be used with, any similar alloy.

Each of the images AI-DIV is a 224×224 pixel micrograph image 202, with a blank padding portion 204 extending the image A1-DIV to be 256×256 pixels. In alternative examples, alternative sizes can be used to the same effect, provided the image includes a blank padding uniformly increasing the size of each image 202. Disposed within the blank padding is a patch 206 containing the encoded data corresponding to the sample that the image AI-DIV is of. The patch is included in the blank padding 204, and is in an identical position within each image AI-DIV such that the intra-pedigree latent space structure is the same across all of the images AI-DIV.

With regards to the GLOW machine learning analysis 130, each image can be deconstructed into three regions, a training data region 212, an unsupported region including significant information 214, and a wholly unsupported region 216. The training data region 212 is the 80% of the image AI-DIV closest to the centroid 208. As the internal 80% (the training data region 212) is sufficient to adequately train for and analyze any given alloy, the GLOW machine learning analysis 130 is trained on 80% of each pedigree's data that is closest to a centroid 208 of the image AI-DIV and the data encoded in the patch 206 superimposed on the bank region 204. The blank region 204 can, in some examples, be the extent of the wholly unsupported region 216. In other examples, the wholly unsupported region 216 can include an exterior circumference of the micrograph 202.

Figure 3:
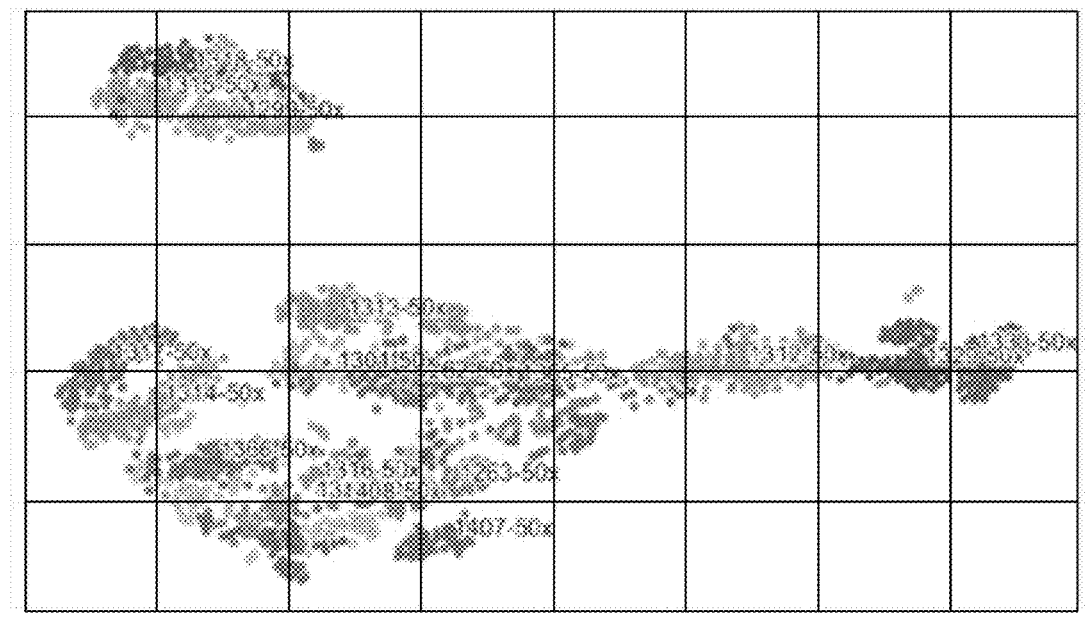
FIG. 3 illustrates a reduced order visualization of a model layer output of the machine-learning algorithm via a T-distributed Stochastic Neighbor Embedding (t-SNE) plot.

The patch 206 includes a set of material properties, or a composite value of multiple material properties, is input for each image AI-DIV. In one example, the material properties include Young's modulus (E), Poisson's ratio, yield strength (Y) and a thermos-elastic strain (ms). In any example, all of the properties are conventional material characteristics and can be measured from a material sample using standard ASTM tests, or any other validated testing system. The images AI-DIV form a 2D image dataset, and the deep learning neural network 10 automatically learns what spectral features correlates with what material properties via alternating convolutional and max pooling layers to learn what visual features in the image correlate with target response. A T-distributed Stochastic Neighbor Embedding (t-SNE) plot 300, of the exemplary data set 200 of FIG. 2 is illustrated in FIG. 3 and is a reduced order visualization of a model layer output of the machine-learning algorithm.

An organic learning process is utilized to determine the non-linear relationships between the microstructural features and the corresponding material properties, with each layer of the organic learning process determining additional parameters based on the determined non-linear relationships. While a specific process, image type, and pixel tile size is described in an exemplary embodiment, it should be understood that the specific details could be modified as needed and still fall within the present disclosure.

Figure 4:
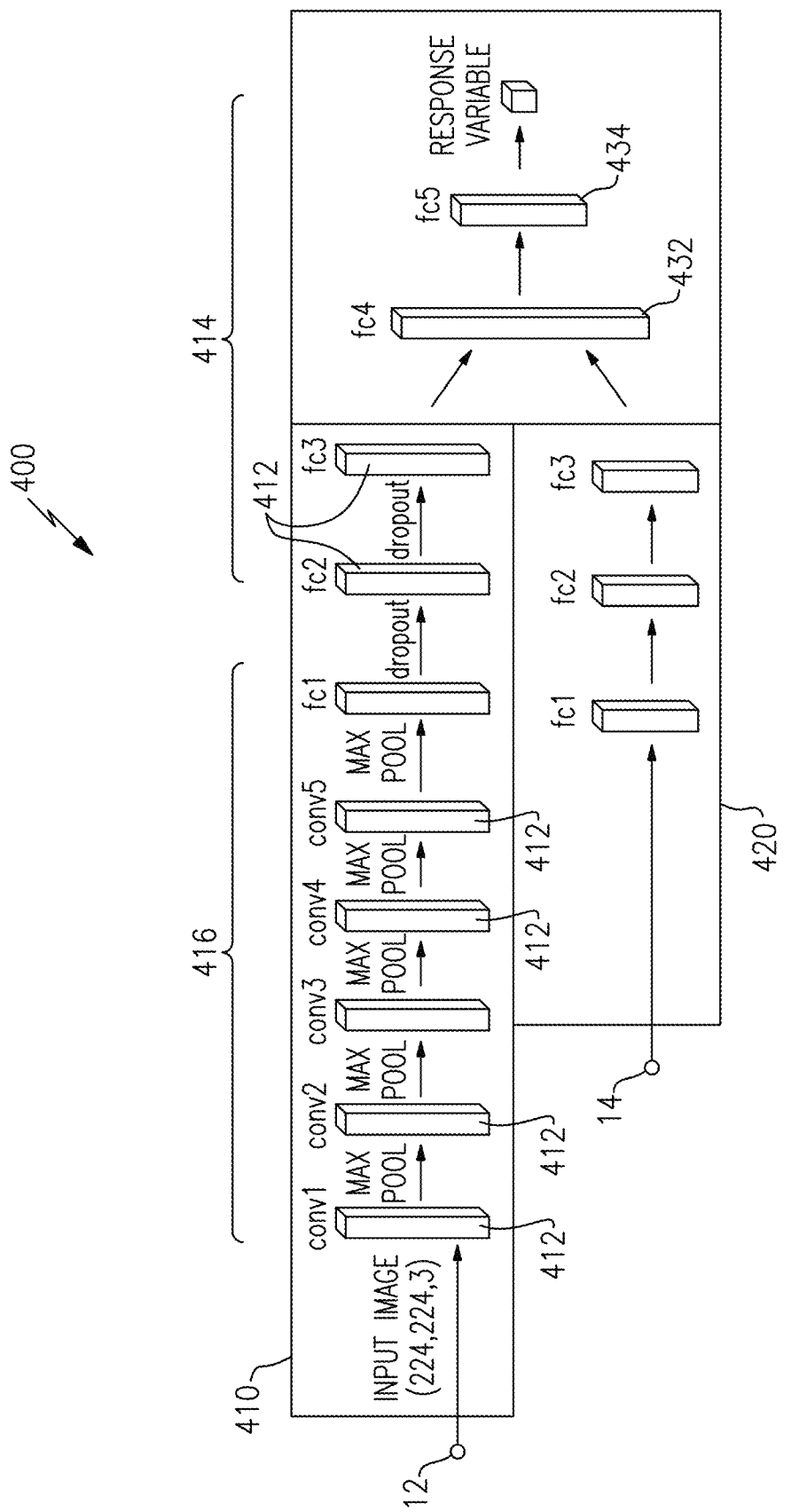
FIG. 4 illustrates an exemplary machine learning process for the image set of FIG. 2.
Figure 5:
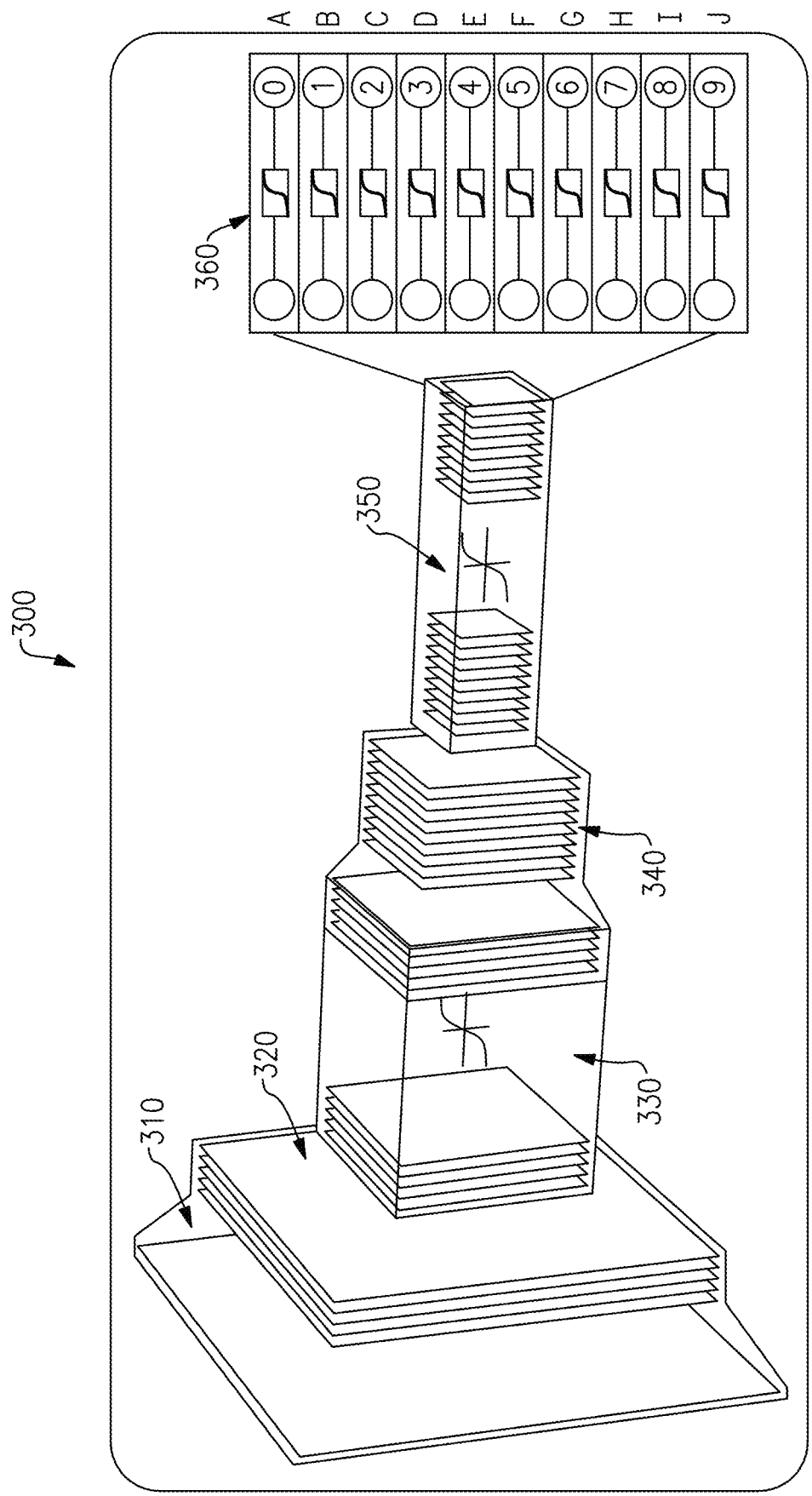
FIG. 5 illustrates a top-level diagram of the training process.

The resultant non-linear relationships are output and merged with a distinct theoretical model incorporating the user specified non-determinable parameters 420 for a set of trained predictive equations 432, 434. The trained predictive equations can be utilized as described above with regards to FIG. 4 to determine an optimized, or a feasible, constituent material for a component based on the material properties that the component is required to have.

With continued reference to FIGS. 1-4, FIG. 5 schematically illustrates two levels of the organic learning process 300 for the neural network described above. The image data set 100 of FIG. 2 is represented via data set 310, and the corresponding material properties are represented via data set 320. The neural network 10 then identifies non-liner relationships between the data 310 of the microstructures shown in the images, and the data 320 of corresponding material properties.

In some example, further corresponding data 340, such as testing data that cannot be determined from images alone such as test stress, temperature, strain rate, R-ratio, Kt, and the like, can be converged with the non-linear relationships 330 to form a second set of non-linear relationships 350. Each time the data is converged to form a new set of non-linear relationships 330, 350 the resultant relationships are referred to as a layer. Based on either the highest set of non-linear relationships 330, or the highest two sets of non-linear relationships 330, 350, a set of predictive equations 360A-J is developed. Each of the predictive equations maps one, or more, of the non-linear relationships and can provide a desired constituent material (e.g. grain size) corresponding to a desired material property (e.g. tensile strength). When a full set of desired material properties is entered, the neural network 10 can solve the system of equations 360A-J for the entire material properties to determine an underlying material constituency to generate an alloy having the desired material properties. In alternative examples, substantially more than two layers can be applied, with the trained predictive equations only be determined by a subset of the layers, with the subset being the last sequential layers. In some examples, only the highest one or two layers is used to generate the predictive equations.

It is further understood that any of the above-described concepts can be used alone or in combination with any or all of the other above described concepts. Although an embodiment has been disclosed, a worker of ordinary skill in this art would recognize that certain modifications would come within the scope of this disclosure. For that reason, the following claims should be studied to determine the true scope and content of this disclosure.

The invention claimed is:

1. A method for designing a material for an aircraft component comprising:
   training a neural network to correlate microstructural features of an alloy with material properties of the alloy by at least providing a set of images of the alloy, each of the images in the set of images having varied constituent compositions and at least one patch of corresponding data embedded into the image, and determining non-linear relationships between the microstructural features and corresponding empirically determined material properties via a machine learning algorithm;
   receiving a set of desired material properties of the alloy for aircraft component; and
   determining a set of microstructural features capable of achieving the desired material properties of the alloy based on the determined non-linear relationships and based on the received set of desired material properties.

2. The method of claim 1, further comprising manufacturing an alloy having the determined set of microstructural features.

3. The method of claim 2, further comprising manufacturing the aircraft component using the alloy having the determined set of microstructural features.

4. The method of claim 1, wherein each image in the set of images is an upscaled RGB (Red-Green-Blue) image.

5. The method of claim 4, wherein each image in the set of images includes a training data region, and wherein the training data region includes a centroid of the image.

6. The method of claim 5, wherein the training data region is a portion of the image including 80% of the image closest to the centroid.

7. The method of claim 5 wherein the at least one patch is contained outside of the training data region.

8. The method of claim 7, wherein the at least one patch is contained within a blank region of the image.

9. The method of claim 1, wherein the empirically determined material properties include Young's modulus (E), Poisson's ratio, yield strength (Y) and a thermal-elastic strain (ms).

10. The method of claim 1, wherein the set of determined material properties corresponding to each image includes empirically determined data corresponding to each image.

11. The method of claim 1, wherein each image includes at least one non-quantifiable material state.

12. A system for automatically determining microstructural features comprising:
    a computer system having an image set input, each image in the image set input included embedded non-visual data, and a memory and a processor, the memory storing instructions for operating a neural network, wherein the neural network is trained to correlate features of an alloy with material properties of the alloy by at least receiving a set of images of the alloy at the image set input, each of the images in the set of images having varied constituent compositions, and receiving a set of empirically determined material properties corresponding to each image at the non-visual data input, embedding the non-visual data of each image onto the corresponding image, and determining non-linear relationships between the microstructural features and corresponding empirically determined material properties via a machine learning algorithm;
    the computer system further including a third input configured to receive one of a set of desired material properties of the alloy for aircraft components and a desired image of the alloy for aircraft components, wherein the memory includes instructions for causing the neural network to determine a set of process parameters capable of achieving the desired material properties of the alloy based on the determined non-linear relationships and based on the one of the received set of desired material properties and the desired image of the alloy for aircraft components; and
    an output configured to output the determined set of microstructural features.

13. The computer system of claim 12, wherein the neural network is configured to receive supplementary training by receiving at least one image of an underlying material of a manufactured component including at least one non-image data patch disposed in a blank region of the image.

14. The computer system of claim 12, wherein each image in the set of images is a RGB (Red-Green-Blue) image.

15. The computer system of claim 14, wherein each image includes at least one non-quantifiable state.

16. The method of claim 12, wherein the empirically determined material properties include Young's modulus (E), Poisson's ratio, yield strength (Y) and a thermos-elastic strain (ms).

17. The method of claim 1, wherein determining non-linear relationships between the microstructural features and corresponding empirically determined material properties via a machine learning algoithm comprises a multi-layer matching learning algorithm where each layer of the machine learning algorithm determining additional parameters based on the determined non-linear relationships.

* * * * *